United States Patent
Knight et al.

(10) Patent No.: US 11,807,531 B2
(45) Date of Patent: Nov. 7, 2023

(54) METHOD AND APPARATUS FOR PROCESSING OF MATERIALS USING HIGH-TEMPERATURE TORCH

(71) Applicant: KNIGHTHAWK ETEC, INC., Houston, TX (US)

(72) Inventors: Clifton T. Knight, Kemah, TX (US); Arthur R. DiNicolantonio, El Lago, TX (US); Erik M. Howard, Seguin, TX (US); Darrell Poteet, Houston, TX (US); Richard C. Stell, Houston, TX (US)

(73) Assignee: KNIGHTHAWK ETEC, INC., Houston, TX (US)

( * ) Notice: Subject to any disclaimer, the term of this patent is extended or adjusted under 35 U.S.C. 154(b) by 548 days.

(21) Appl. No.: 16/505,920

(22) Filed: Jul. 9, 2019

(65) Prior Publication Data

US 2021/0009412 A1    Jan. 14, 2021

(51) Int. Cl.
| | |
|---|---|
| *C01B 3/36* | (2006.01) |
| *B01J 6/00* | (2006.01) |
| *B01J 12/00* | (2006.01) |
| *B01J 4/00* | (2006.01) |

(52) U.S. Cl.
CPC ............ *C01B 3/363* (2013.01); *B01J 4/002* (2013.01); *B01J 6/008* (2013.01); *B01J 12/005* (2013.01); *C01B 2203/0255* (2013.01); *C01B 2203/0272* (2013.01); *C01B 2203/0415* (2013.01); *C01B 2203/1241* (2013.01); *C01B 2203/1247* (2013.01); *C01B 2203/1258* (2013.01)

(58) Field of Classification Search
CPC ...................................................... C01B 3/363
See application file for complete search history.

(56) References Cited

U.S. PATENT DOCUMENTS

| | | | | |
|---|---|---|---|---|
| 4,520,760 | A * | 6/1985 | Covell | C10J 3/76 122/6 A |
| 5,319,176 | A * | 6/1994 | Alvi | C03B 19/1045 219/121.36 |
| 5,725,616 | A * | 3/1998 | Lynum | C01B 3/24 48/127.3 |
| 6,395,197 | B1 * | 5/2002 | Detering | B01J 19/088 252/373 |
| 6,571,747 | B1 * | 6/2003 | Gerstweiler | C07C 29/1518 123/3 |
| 2005/0217483 | A1 * | 10/2005 | Shimada | C01G 3/04 95/140 |
| 2012/0061618 | A1 * | 3/2012 | Santoianni | C10B 53/08 252/373 |
| 2014/0223821 | A1 * | 8/2014 | Knight | C10J 3/485 48/89 |

(Continued)

FOREIGN PATENT DOCUMENTS

WO        2023023208 A1     2/2023

*Primary Examiner* — Paul A Wartalowicz
(74) *Attorney, Agent, or Firm* — Ewing & Jones, PLLC (57) ABSTRACT

A method and apparatus for reforming carbonaceous material into syngas containing hydrogen and CO gases is disclosed. In one embodiment, a hydrogen rich torch reactor is provided for defining a reaction zone proximate to torch flame. One input of the reactor receives input material to be processed. Further inputs may be provided, such as for example to introduce steam and/or gases such as methane, oxygen, hydrogen, or the like.

6 Claims, 10 Drawing Sheets

(56) References Cited

U.S. PATENT DOCUMENTS

| | | | |
|---|---|---|---|
| 2015/0040565 A1* | 2/2015 | Tan | F01K 25/00 |
| | | | 48/209 |
| 2016/0195270 A1* | 7/2016 | Dube | F23J 15/02 |
| | | | 110/345 |
| 2016/0365593 A1* | 12/2016 | Fronk | C10K 1/10 |
| 2020/0140768 A1 | 5/2020 | Kelfkens et al. | |

* cited by examiner

METHOD AND APPARATUS FOR PROCESSING OF MATERIALS USING HIGH-TEMPERATURE TORCH

BACKGROUND

The present disclosure relates generally to the processing of materials using a high-temperature torch reactor.

Across a variety of industries there is and has been a need and desire to efficiently process various materials, including but not limited to carbonaceous materials and materials including some percentage of hydrocarbons, and in particular to reform various materials with a high percentage of volatiles (fly ash, biomass, municipal solid waste, low rank coal, even heavy residuals after crude oil distillation) into other useful forms, such as synthesis gas or "syngas." (As used herein, the synonymous terms "synthesis gas" and "syngas" will be understood according to accepted usage to refer to a fuel gas mixture consisting primarily of hydrogen ($H_2$) and carbon monoxide (CO), small percentages of hydrocarbons along with inert gases such as nitrogen, steam, and carbon dioxide, and possibly various inorganic impurities, such as sulfur, chlorine, and/or other halogen-containing species. Furthermore, as used herein, the term fly ash will be understood according to accepted usage to refer generally to a category of particulate material most often produced as a product of coal combustion and the like; depending upon the source, the exact composition of fly ash may vary considerably, but may contain silicon dioxide ($SiO_2$), aluminum oxide ($Al_2O_2$), calcium oxide (CaO), and may also contain appreciable percentages of carbon and other hydrocarbons.)

Various methods known in the prior art for accelerating reformation generally fall into one of two broad categories: The first category includes methods involving the use of a catalyst; the second category includes methods that do not involve catalysts, but involve interaction of the material to be reformed with a plasma generated by an internal electrical discharge within the material or obtained by passing a gas through a high-voltage electric field prior to mixing with the material to be reformed Some known catalytic reactor approaches to endothermic hydrocarbon reformation involve an inefficient, indirect (e.g., through a containment wall) heat supply to the reaction space. It has been proposed in the prior art to employ an adiabatic heat transfer as a combination of an exothermic partial oxidation with endothermic steam reforming, sometimes referred to as "autothermal reforming."

In U.S. Pat. No. 5,122,527 to Kobylinski, for example, there is proposed a two-stage process where a light hydrocarbon is firstly subjected to a partial oxidation and steam reforming on a bifunctional catalyst with a temperature increase associated with consumption of the all input oxygen. In the second stage, unconverted hydrocarbon gases react with the remaining steam on a nickel catalyst to reach a desirable conversion efficiency into syngas. According to the '527 patent, the heat requirements for endothermic steam reforming on the first and second stages are fully met by partial oxidation of a hydrocarbon without the need of an external heat supply.

U.S. Pat. No. 4,927,857 to McShea et al. describes an autothermal reformer utilizing monolithic catalyst containing palladium for partial oxidation and platinum and platinum group metals catalyst for steam reforming. The autothermal reformer provides a relatively simple and compact reactor within which a wide variety of hydrocarbonaceous feeds, from heavy hydrocarbon feedstocks to natural gas may be utilized for synthesis gas production.

It has been recognized in the prior art that poisoning and fouling of catalysts are frequently the cause of catalysts losing their activity. The catalysts employed in reforming of hydrocarbons are characterized by their selective action on certain hydrocarbons and a high deactivation rate due to a presence of sulfur or chlorine containing species in the feedstock. See, for example, (Bartholomew C., Mechanisms of Catalyst Deactivation. Applied Catalysis A: General 212 (2001) (pp. 17-60).

It has also been proposed in the prior art that reforming of hydrocarbons can be activated by continuous injection, or generation in situ, of a gas containing excited molecules, ions, electrons and radicals (plasma gas). Due to the continuous nature of such method, in contrast to the processes involving catalysts, these methods are potentially applicable to any hydrocarbons, independent of their structures and impurities.

In U.S. Patent Application Publication No. 2007/0272131, filed by Carabin et al., there is proposed a second stage gasifier, wherein gases containing the hydrocarbons left unconverted by the first stage gasifier are mixed with a thermal plasma gas (jet) in order to complete the conversion into syngas. The thermal plasma gas is produced in plasma torches where the gas is heated to about 5000° C. along with passing through the gap between high-voltage electrodes. It is believed that a presence of ions, electrons, and radicals in the plasma gas attributes to its catalytic action on hydrocarbons decomposition.

U.S. Pat. No. 8,475,551 to Tsangaris et al. describes reformulating chambers of different configurations with various locations for plasma torches allowing for diverse flow patterns for process gas. The '551 patent suggests that those flow patterns can improve a contact between process and plasma gases, and suggests that thermal plasma gas mixed with a gaseous carbonaceous feedstock (reformulating process gas) facilitates decomposition of light and heavy hydrocarbons, soot, chlorinated species and tars in it into simple inorganic molecules such as $H_2$ and CO (syngas), halides, sulfides, and the like. A control system regulates plasma torch power as well as consumption of additives such as air (oxygen), steam, and carbon dioxide to obtain a desired conversion degree into syngas with a predetermined ratio between $H_2$ and CO.

With regard to electric discharge generated plasma-based methods, U.S. Pat. No. 6,881,386 of Rabinovich et al., and U.S. Pat. No. 9,017,437 to Hartvigsen et al., each suggest that different types and configurations of continuous electric discharges within a gas containing hydrocarbons facilitate their reforming into syngas.

U.S. Pat. No. 4,013,428 to Babbitt appears to describe an application of an oxy-hydrogen flame to introduce an ultra superheated steam into a reaction space. The '428 patent proposes a sudden expansion pre-burner to make an ultra superheated steam (up to 2800° C.) by combustion of hydrogen with oxygen. Due to structural limitations, such steam temperatures cannot be reached in conventional boilers. The '428 patent does not describe or suggest any direct contact between an oxy-hydrogen flame and hydrocarbons.

On the other hand, a direct contact between hydrocarbons and an oxy-hydrogen flame in a laboratory reactor placed into an electric tube furnace has been reported on in publications of Granovskii et al.: "An effect of tar model compound toluene treatment with high-temperature flames," Fuel (2012), pp. 369-372; "Decomposition of tar model compound toluene by treatment with the high-temperature hydrogen/oxygen flame," Proceedings of 19th European Biomass Conference and Exhibition, pp. 1530-1538, 6-10 Jun. 2011, Berlin, Germany. D01:10.571/19thEUBCE2011-VP2.4.1; (collectively, "the Granovskii references"). The Granovskii references suggest that an oxy-hydrogen flame acts like a thermal plasma gas promoting decomposition into syngas of an aromatic hydrocarbon largely diluted in steam and nitrogen to about 1% vol. in the gas. The experimental design proposed in the Granovskii references did not assume or contemplate autothermal conditions, as the small hydrocarbon content involved did not allow reaching temperature levels needed for conversion. A separate input for air or oxygen required for an autothermal reforming of significantly greater contents of hydrocarbons in industrial applications as well as a reactor configuration with separate inlets for air/oxygen and hydrocarbon-steam mixture were not considered in those publications.

SUMMARY

In view of the foregoing and other considerations, the present disclosure is directed to a method and apparatus for processing of materials to extract useful byproducts such as syngas through activation within a high-temperature torch reactor, without the need for a solid catalyst.

In some examples, a material processing system incorporates a plurality of high-temperatures torches to activate a decomposition into H2 and CO (syngas) and simultaneously extract solid constituent elements of the processed material. Oxygen may supplied in a substoichiometric quantity to meet partial oxidation requirements to make syngas, according to the following Reaction (1):

$$C_nH_m + \left(\frac{n}{2}\right)O_2 = nCO + \left(\frac{m}{2}\right)H_2 + \text{Heat} \quad (1)$$

In one example, the injection of the flame avoids the need for solid catalysts, which as described above are very sensitive to impurities in the gas and the type of processing hydrocarbons.

With adiabatic temperature of the oxy-hydrogen rich flame (i.e. approaching 2800° C.) the number of radicals and ions in combustion products increases. An interaction of those radicals (especially "OH." radicals) with hydrocarbons promotes their breakdown reactions. The oxy-hydrogen rich flame is associated with an ultra-high (extraordinary) superheated steam in combustion products. As is known by persons of ordinary skill in the art, the higher the steam temperature, the greater is its promotion of endothermic reforming of hydrocarbons according to the following Reaction (2):

$$C_nH_m + nH_2O = nCO + \left(\frac{m}{2} + n\right)H_2 - \text{Heat} \quad (2)$$

An excess of steam, provided by a mix of water vapor with gaseous hydrocarbons ($C_nH_m$) in the input flow, also assists in shifting of this reaction to the right unless a dilution of hydrocarbons offsets this shift by a substantial temperature decrease in the reaction zone.

Hydrogen produced in accordance with Reaction (2) above competes for oxygen with a hydrocarbon (Reaction (1)) through steam, generating a reaction according to the following Reaction (3):

$$nH_2 + \left(\frac{n}{2}\right)O_2 = nH_2O + \text{Heat} \quad (3)$$

A partial oxidation reaction of hydrocarbons (Reaction (1)) can be obtained as a combination of Reactions (2) and (3). A mechanism of the partial oxidation Reaction (1) through Reactions (2) and (3) avoids undesirable chemical routes associated with incomplete combustion and coke, soot, and tars generation as shown, for instance, Reaction (4) below:

$$C_nH_m + \left(\frac{n}{2}\right)O_2 = \quad (4)$$
$$\left(\frac{n}{4}\right)CO_2 + \left(\frac{n}{2}\right)H_2O + C_{n-\frac{n}{4}}H_{m-n}(\text{coke, soot, tars}) + \text{Heat}$$

In one example, the oxy-hydrogen rich flame ignites oxidation reactions in the hydrocarbon-oxygen mixture accompanied by their own heat release, which retards cooling the oxy-hydrogen flame combustion products. This retardation inclines steam (main combustion product) temperature associated with an increasing content of radicals in it. Both factors favor Reactions (1)=(2)+(3) in comparison to Reaction (4).

The use of the oxy-hydrogen rich flame is analogous to utilization of thermal plasma gas (air) to convert gaseous hydrocarbons into syngas in reformers and gasifiers, but, advantageously, it is inherently more reactive and consumes substantially less energy, Moreover, an oxy-hydrogen rich burner, in contrast to a plasmatron, enables a flexible and simple integration into a chemical reactor.

In some examples, the conversion or reformation may be activated by a methane-hydrogen rich flame ignited within a converter constructed in accordance with one example. The converter comprises a methane-hydrogen rich burner, igniter, inputs for oxygen, steam, and solid, gaseous or liquid feedstock materials. The stream is injected in vicinity of the tips of one or more torches. In some examples, oxygen may be introduced either upstream or immediately downstream of the burners. Oxygen may be supplied in a substoichiometric amount to avoid complete combustion of hydrocarbons into $CO_2$ and $H_2O$. The methane-hydrogen rich torches consume externally generated, mixed stoichiometric or sub stoichiometric quantities of methane, hydrogen and/or oxygen. Following this mixture ignition, the methane-hydrogen rich burner is applied to a feedstock stream. The torch flames, due to their high temperatures of up to 2800° C., intensive ultraviolet radiation, a presence of radicals (especially "OH." radicals), and, in some examples, ultra-superheated steam, actively initializes reforming of the processed material into syngas or other useful byproducts. This is considered to be an autothermal reforming process. After conditioning, the produced syngas can be advantageously utilized in a wide range of industrial technologies including power generation, synthetic chemicals such as ammonia, and fuels such as methanol.

In some examples, the use of a methane-hydrogen rich flame supplants the need for generation of thermal plasma gas (air) as in prior art reformers and gasifiers. The methane-hydrogen flame may be more reactive and/or more energy efficient than a plasmatron. A methane-hydrogen rich burner, in contrast to a plasmatron, enables a flexible and simple integration into a high-temperature converter. The use of the methane-hydrogen flame is especially beneficial if processed materials are highly contaminated with sulfur, and halogen containing species that can deactivate a majority of metallic catalysts.

In various examples, the process exhibits a high tolerance to impurities in the input feedstock and admits to simple adjustment to different feedstocks by controlling consumption of hydrogen/methane-oxygen mixture in the flame, input steam-to-carbon, and oxygen-to-carbon ratios. The heating value of the hydrogen consumed in the oxy-hydrogen rich burner preferably does not exceed of 15% of heating value of the syngas produced in order to be economically reasonable.

Moreover, in some examples hydrogen may be separated from the syngas produced from the inventive process, using, for example, known pressure swing adsorption technologies and techniques, and may advantageously be fed back to the reformer zone as a supply to the oxy-hydrogen burner, thereby possibly enhancing the overall efficiency of the overall system.

BRIEF DESCRIPTION OF THE DRAWINGS

The foregoing and other features and advantages described herein will be more fully appreciated by reference to a detailed description of one or more examples, when read in conjunction with the accompanying drawings, in which.

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such development efforts might be complex and time-consuming, outside the knowledge base of typical laymen, but would nevertheless be a routine undertaking for those of ordinary skill in the relevant fields.

Figure 1:
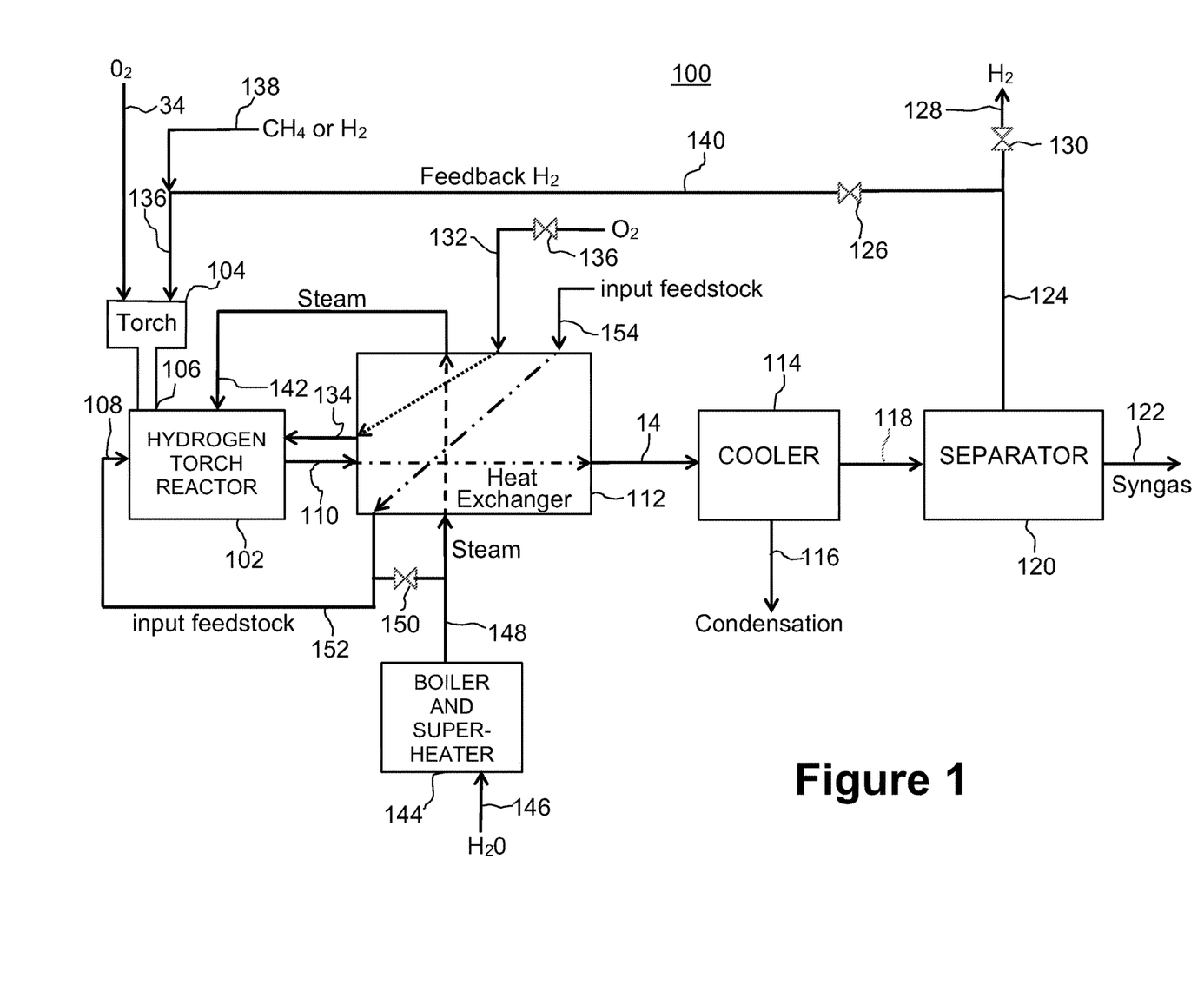
FIG. 1 is a functional block diagram of an example material processing system in accordance with this disclosure.

Referring to FIG. 1, there is shown a functional block diagram of a hydrogen/methane torch reforming system 100 in accordance with one example. As shown in FIG. 1, system 100 includes a hydrogen/methane torch reactor 102 having a number of input ports as will be hereinafter described. System 100 further comprises at least one hydrogen/methane torch 104 inserted into a port 106 of reactor 102 and adapted to produce a methane-hydrogen flame within a contained reaction zone defined within reactor 102, as will hereinafter be described in further detail. A feed input nozzle 108 is provided for introducing material to be processed and/or reformed into reactor 102. In one example, an output 110 of the reactor 102 passes through a heat exchanger 112 in order that thermal energy of the reactor output can be at least partially utilized within heat exchanged 112 to pre-heat other process elements, as herein described. Such utilization of thermal energy of output 110 from reactor 102 may advantageously contribute to an overall level of efficiency in the operation of system 100, as would be appreciated by those of ordinary skill in the art.

In one example, operation of system 100 may be continuous, such that the output 110 from reactor 102 substantially comprises a continuous stream, which may have both gaseous and particulate components. After passing through heat exchanger 112, the reactor output 110 may be applied to a cooler 114 to decrease temperature to a level associated with water vapor condensation into liquid water, which may then be produced at an output 116. In the present example, the cooled output 110 may then provided from an output 118 of cooler 114 to a separator 120. In one example, separator 120 functions to separate and extract hydrogen from the output 110 of reactor 102. Those of ordinary skill in the art will recognize that various separation techniques and technologies are known for separating and extracting hydrogen gas in a suitable manner. In one example, separator 120 may comprise a pressure swing adsorption (PSA) unit. PSA units are employed as a means of separating some gas species from a mixture of gases under pressure according to the species' molecular characteristics and affinity for an adsorbent material. Suitable PSA technologies and processes are well known to those of ordinary skill in the art.

In another example, separator 120 may comprise a centrifugal separation device such as a vortex cooler. Various suitable types and configurations of vortex coolers are known and commercially available from various suppliers.

It is contemplated that other separation technologies, including, without limitation, membrane gas separation, may be employed in conjunction with the various examples described herein.

With continued reference to FIG. 1, separator 120 functions to separate hydrogen from other components of output 110. The remaining components of output 110 may be presented at an output 122 of separator 120, while the hydrogen gas ($H_2$) separated from the output 110 by separator 120 may be directed through at an output 124 of separator 120 to be fed back to reactor 102 to supply fuel for the flame produced by the one or more torches 104. A valve 126 may be provided to selectively control an amount of $H_2$ fed back from separator 120 to torch 104. In addition, or in the alternative, $H_2$ extracted by separator 120 may be provided at a separate output 128 of system 100, as selectively controlled by a valve 130.

Reactor 102 may have a number of additional input ports for receiving constituent materials for the process operation of system 100. In one example, there may be provided a source 132 of oxygen ($O_2$) via an input 134 to reactor 102. This oxygen supply 132 may be selectively introduced by means of a valve 136. The oxygen supplied at input 134 may be combined with hydrogen ($H_2$) and/or methane ($CH_4$) supplied to torch 102 to create an oxy-hydrogen/methane flame.

As shown in FIG. 1, the $H_2$ supplied to torch 104 is fed through an input 136 of torch 104 may be provided from an external $H_2$ source 138, or may be provided from separator 120 via a feedback line 140 from separator 120, through valve 126, as herein described. As would be appreciated by those of ordinary skill, even if it is desired for most or all of the $H_2$ needed for the oxy-hydrogen flame to be provided in a recycle arrangement from separator 120, an external $H_2$ source 138 may be provided for the purposes of providing $H_2$ long enough for the process to proceed for a period sufficient for a steady stream of $H_2$ to be produced by separator 120.

Reactor 102 may also have a steam input port 142 for introducing superheated steam into reactor 102. In one example, steam is produced by a boiler and super-heater 144 receiving an input 146 of water ($H_2O$). An output 148 of boiler and super-heater 144 may be directed through heat exchanger 112 prior to introduction into reactor 102 through input port 142. In addition, as shown in FIG. 1, steam at output 148 of boiler and super-heater 144 may be partially directed through a valve 150 to be combined with input feedstock carried through an input line 152 to input port 108 of reactor 102. As shown in FIG. 1, in one example, input feedstock 154 may be introduced into system 100 via heat exchanger 112, thereby pre-heating the input feedstock 154 prior to introduction into reactor 102 via input port 108. Steam through valve 150 may serve as a carrier for the input feedstock 154.

Figure 2:
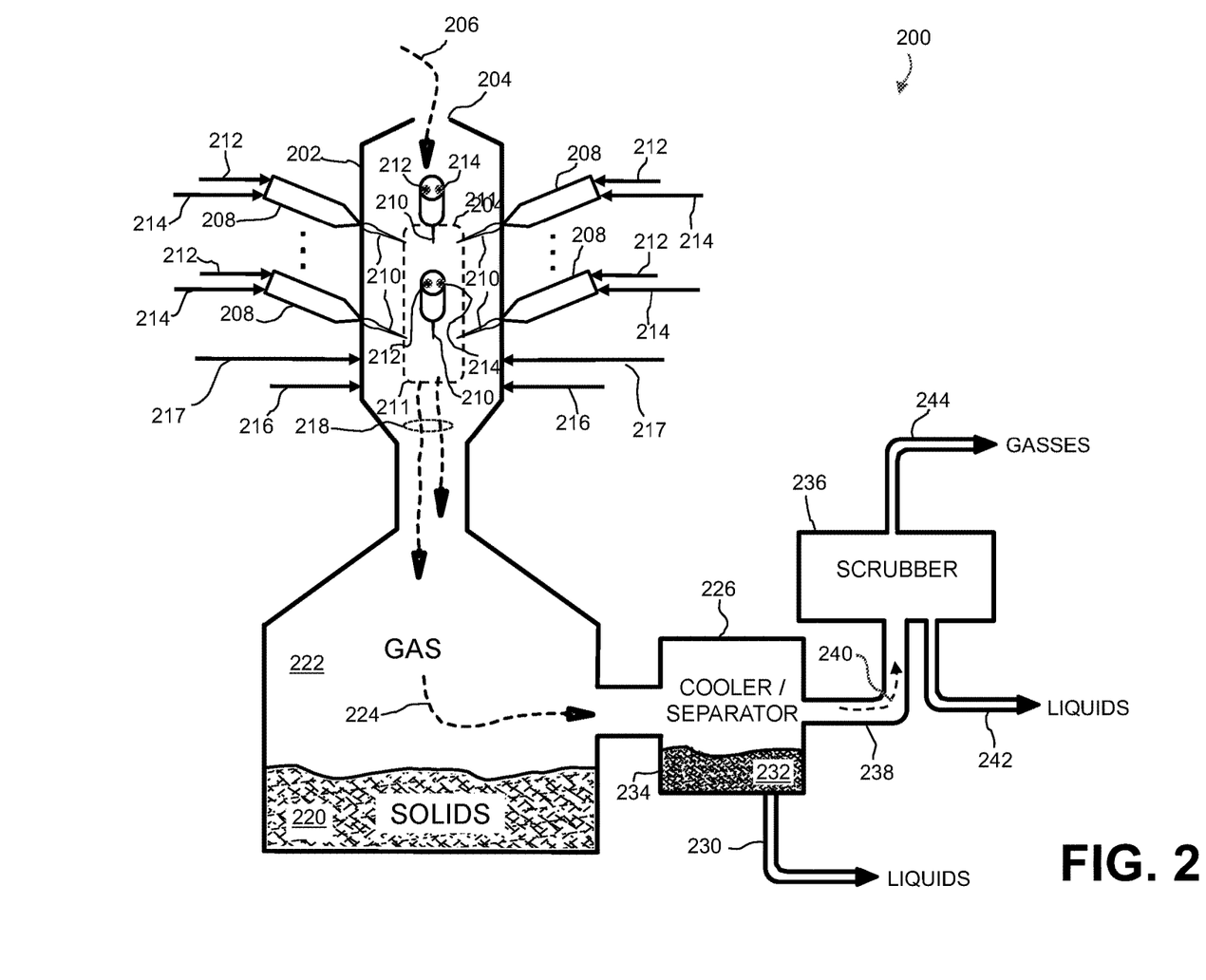
FIG. 2 is a block diagram of another example material processing system in accordance with this disclosure.

Turning to FIG. 2, there is shown a block diagram of another example of a reactor system 200 for processing input material using a plurality of high-temperature torches in a reactor. In particular, system 200 in one example includes a reactor 202 having an input 204 for receiving input feedstock 206. Reactor 202 is equipped with at least one, and in the example of FIG. 2, a plurality of torches 208 for creating one or more torch flames 210 within reactor 202. In one example, reactor 202 is substantially cylindrical, and torches 208 are disposed in a spaced-apart circumferential relationship around reactor 202, such that input feedstock 206 passes transversely through torch flames 210 within reactor 202. The one or more torch flames 210 within reactor 202 define a combustion zone represented generally by dashed line 211 in FIG. 2

In one example, each torch 208 has at least one input 212 for receiving a supply of a torch fuel, such as hydrogen ($H_2$) or methane ($CH_4$), or a combination thereof, and an input 214 for receiving an additional input, such as oxygen ($O_2$). As will be appreciated by those of ordinary skill having the benefit of the present disclosure, the relative amounts of torch fuel(s) and other inputs may be varied depending upon such factors as the desired temperature to be achieved at torch flames 210 and the composition of input feedstock 206. Moreover, the geometry of torch flames 210 and their positioning and orientation with respect to the path of input feedstock 206 can also influence the overall performance of system 200.

As noted above, in another example, each torch may have inputs (not shown explicitly in FIG. 2) for receiving other torch fuels or inputs. In various examples, the inputs supplied to torches 208 may comprise, separately, or in various combinations, methane, hydrogen, acetylene, oxygen, and/or nitrogen. In some examples, nitrogen may comprise less than ten percent (10%) of the torch input. It is contemplated that the composition of torch inputs introduced through inputs 212 and/or 214 of torches 208 may vary depending upon the nature and composition of input feedstock 206.

As shown in FIG. 2, torches 208 may be arranged such that input feedstock 206 passes through a plurality of stages of torch flames 210 as it passes through reactor 202, providing a sequence of relatively small volume targets for torch flames 210. In one example, and as shown in FIG. 2, torches 208, and hence torch flames 210, are oriented at an angle with respect to the sidewall of reactor 202.

With continued reference to the example of FIG. 2, reactor 202 may be provided with one or more inputs 216 for the introduction of steam into reactor 202. In one example, steam from inputs 216 is introduced downstream of torches 208, and is provided to facilitate the high-temperature reaction induced by heat from torch flames 210. In addition, in one example, additional reactants, such as methane, may be introduced into reactor 202 via one or more inputs 217, as shown in FIG. 2. Inputs 217 be positioned ahead of, within, or beyond combustion zone 211.

In some examples, input feedstock 206 may be introduced into reactor 202 along with a gaseous and/or liquid carrier. In one example, an input such as fly ash, a particulate, may be carried into reactor 202 with a gaseous stream, such as a stream of methane ($CH_4$). In another example, an input such as fly ash may be mixed with water and introduced into input 204. Once input feedstock 206 has passed through torch flames 210, with or without an accompanying carrier, a resulting primary reactor output stream 218 of processed material exits reactor 202, as shown in FIG. 2. Depending upon the composition of input feedstock 206, as described in further detail below, processed material stream 218 may include both gaseous and particulate (i.e., substantially solid) components. In one example, therefore, reactor 202 is oriented substantially vertically, as shown in FIG. 2, such that with gravity assistance, particulate components 220 of processed stream 216 may be collected in a containment portion 222 of processing system 200, while gaseous components 224 of primary reactor output stream 218 may exit as shown in FIG. 2 to a cooler/separator 226.

In some examples, input feedstock 206 may be preheated (for example, as described in the example of FIG. 1) to promote the reaction processes within reactor 202.

As in the example described above with reference to FIG. 1, cooler/separator 226 in the example of FIG. 2 may facilitate the condensation of liquid vapors, such as water vapor, contained within the gaseous component of primary reactor output stream 218. Liquids accumulated in cooler/separator 226 may be extracted from system 200 via an output line 230. As shown in FIG. 2, some amount of particulate (i.e., solid) material 232 may also accumulate in a collection area 234 of cooler/separator 226.

Although only a single cooler block 226 is depicted in FIG. 2, in some examples, more than one cooling stage may be implemented. A first stage cooler may primarily bring reactor output 224 to a temperature sufficient to precipitate out residual heavy metals and the like. Subsequent cooling stages may further condensate the reactor output to extract liquids, such as water, which may be released through output 230 in the representation of FIG. 2. Cooler/separator 226 (or more than one cooler/separator) may have a collection area 234 for accumulation of precipitated material 232.

In one example, an output 238 of cooler/separator 226, with one or more than one stage, may convey a substantially gaseous output stream 240 of non-liquid and non-particulate output from reactor 202 to a scrubber 236. In scrubber 236, further cleaning of the output stream 240 occurs, such as to extract components such as gaseous $H_2S$, nitrous components (NOx and/or $NH_3$, for example), using chemical, catalytic and other known scrubbing techniques. In one example, scrubber 236 may be provided with a liquid drain 242 and a gas output 244.

Among the gaseous output from scrubber 236 may be an appreciable percentage of carbon dioxide $CO_2$. As will be appreciated by those of ordinary skill, the composition of the outputs 242, 244 from scrubber 236 will depend upon the nature of the input feedstock 206, along with any carrier materials, such as carrier gases or liquids.

It will be understood by those of ordinary skill in the art having the benefit of this disclosure that the various process outputs, such as output(s) 230 from cooler/separator 226, and outputs 242 and 244 from scrubber 236, may produce materials (liquids, solids, or a combination thereof) requiring further processing for recapture, re-use, and/or disposal.

Figure 3:
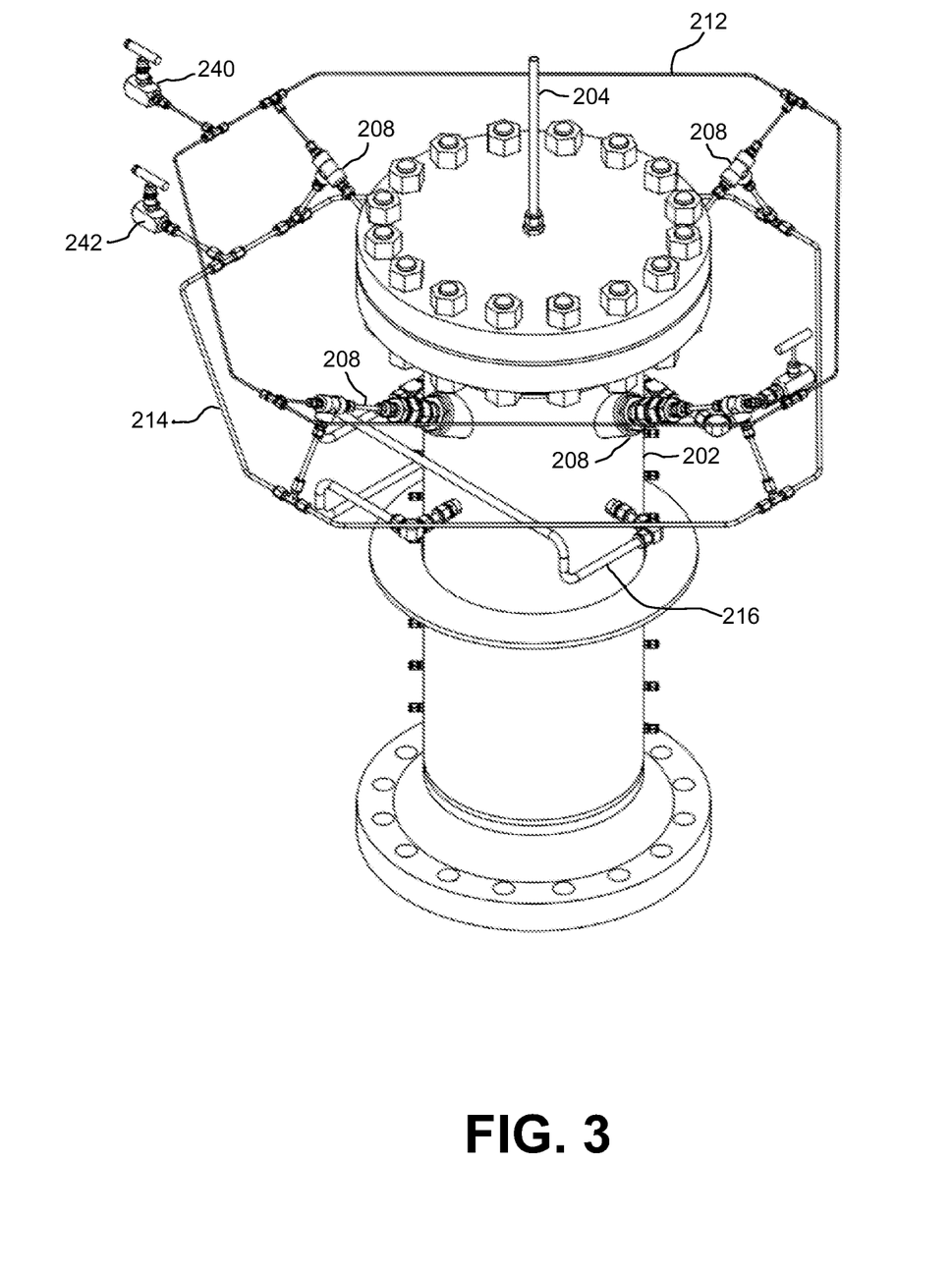
FIG. 3 is a perspective view of a portion of the example material processing system from FIG. 2 including a reactor portion thereof.

Turning to FIG. 3, there is shown a perspective view of a portion of the example processing system 200 of FIG. 2, including an example implementation of reactor 202. As shown in FIG. 3, input 204 is provided for introduction of input feedstock. It will be understood by those of ordinary skill having the benefit of the present disclosure that various physical implementations of input 204 may employed depending upon the composition and nature of the input feedstock. The example of FIG. 3 is generally adapted to receive a predominantly gaseous feedstock, whereas an implementation of system 200 may be provided for processing other input feedstock, such as fly ash or the like, having a more particulate composition. In such cases, the input feedstock may include, in addition to the material to be processed, one or more carriers, such as gaseous carriers, or liquid carriers. For example, fly ash may be mixed with water or other liquids and introduced through an input 204 in the form of a liquid slurry.

FIG. 3 shows first and second torch input lines 212 and 214, as well as steam input(s) 216. A valve 240 may be provided to control the supply of first torch fuel through inputs 212, and a valve 242 may be provided to control the supply of second torch fuel through inputs 214.

Figure 4:
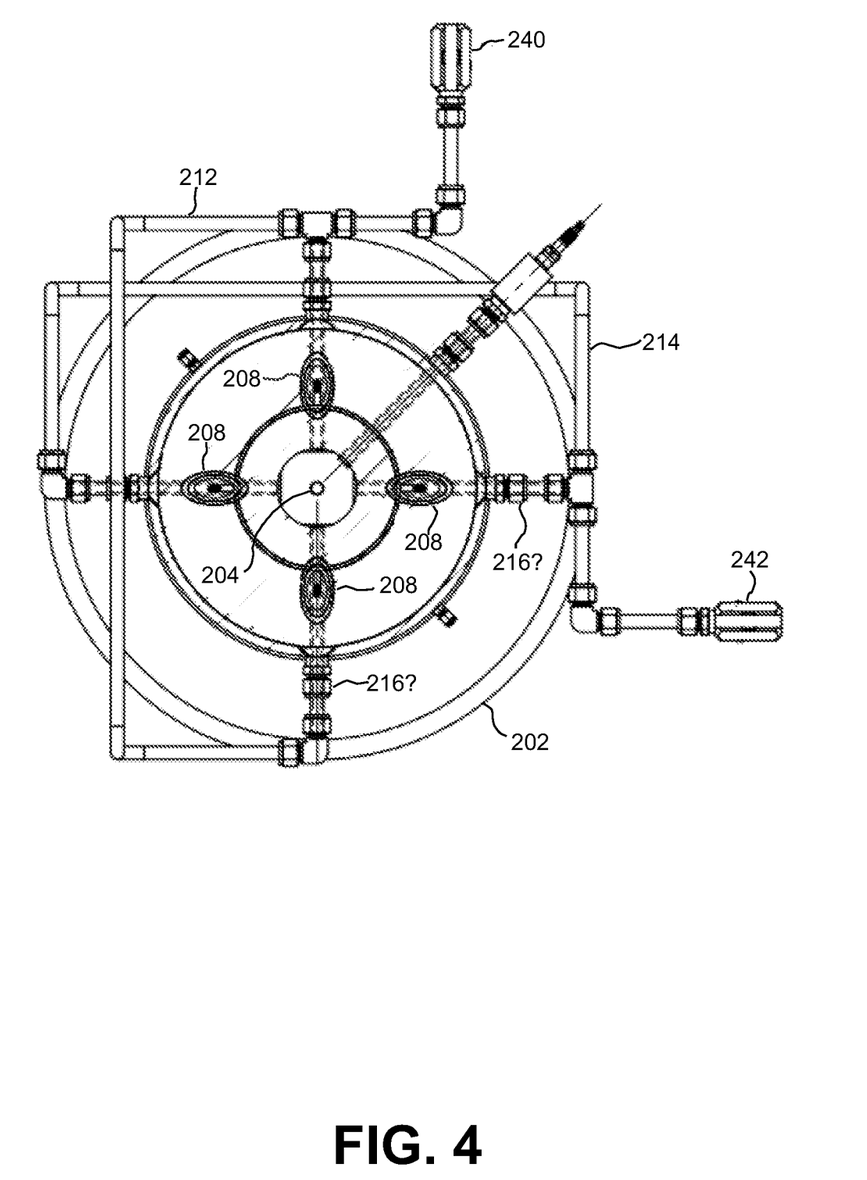
FIG. 4 is a top view of the portion of the example material processing system from FIG. 3.
Figure 5:
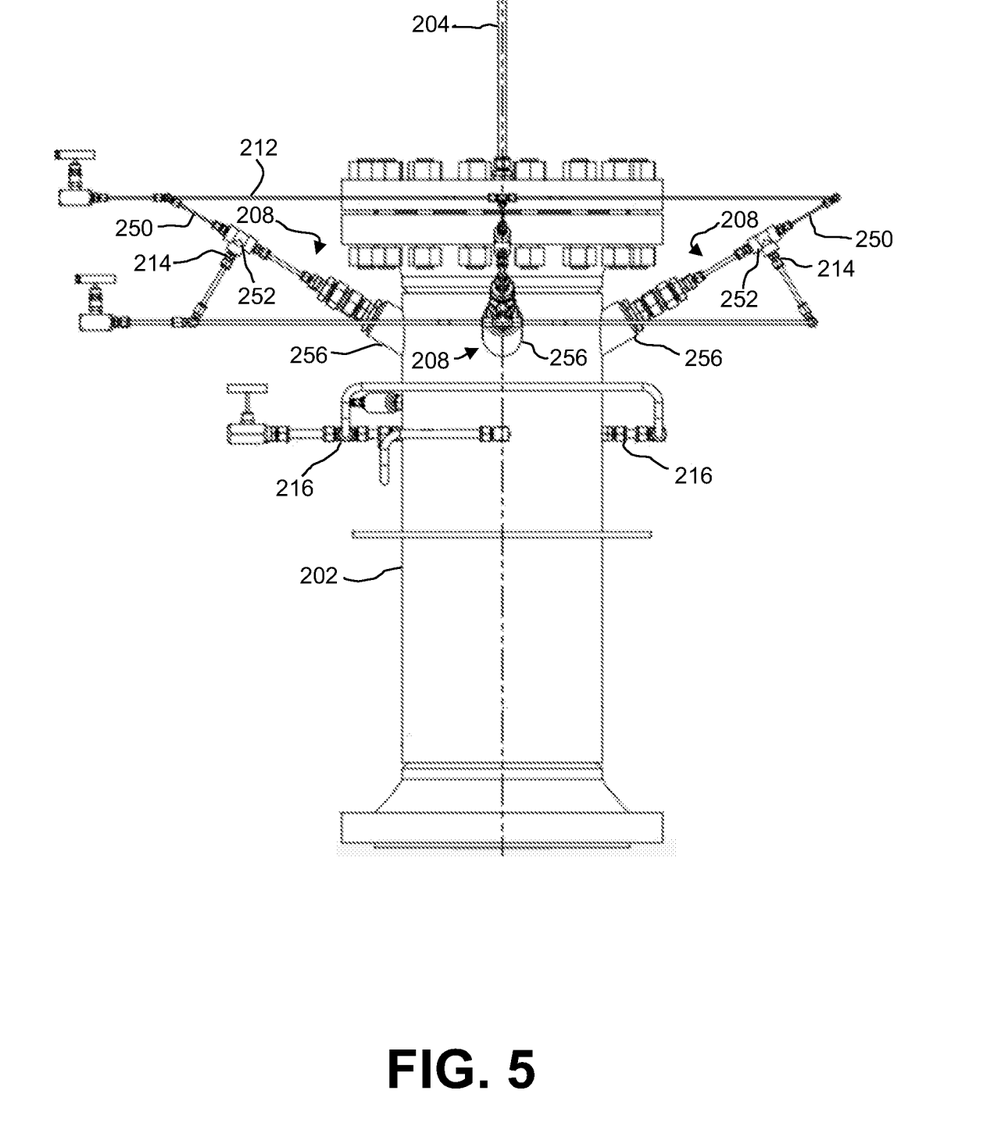
FIG. 5 is a side view of the portion of the example material processing system from FIG. 3.
Figure 6:
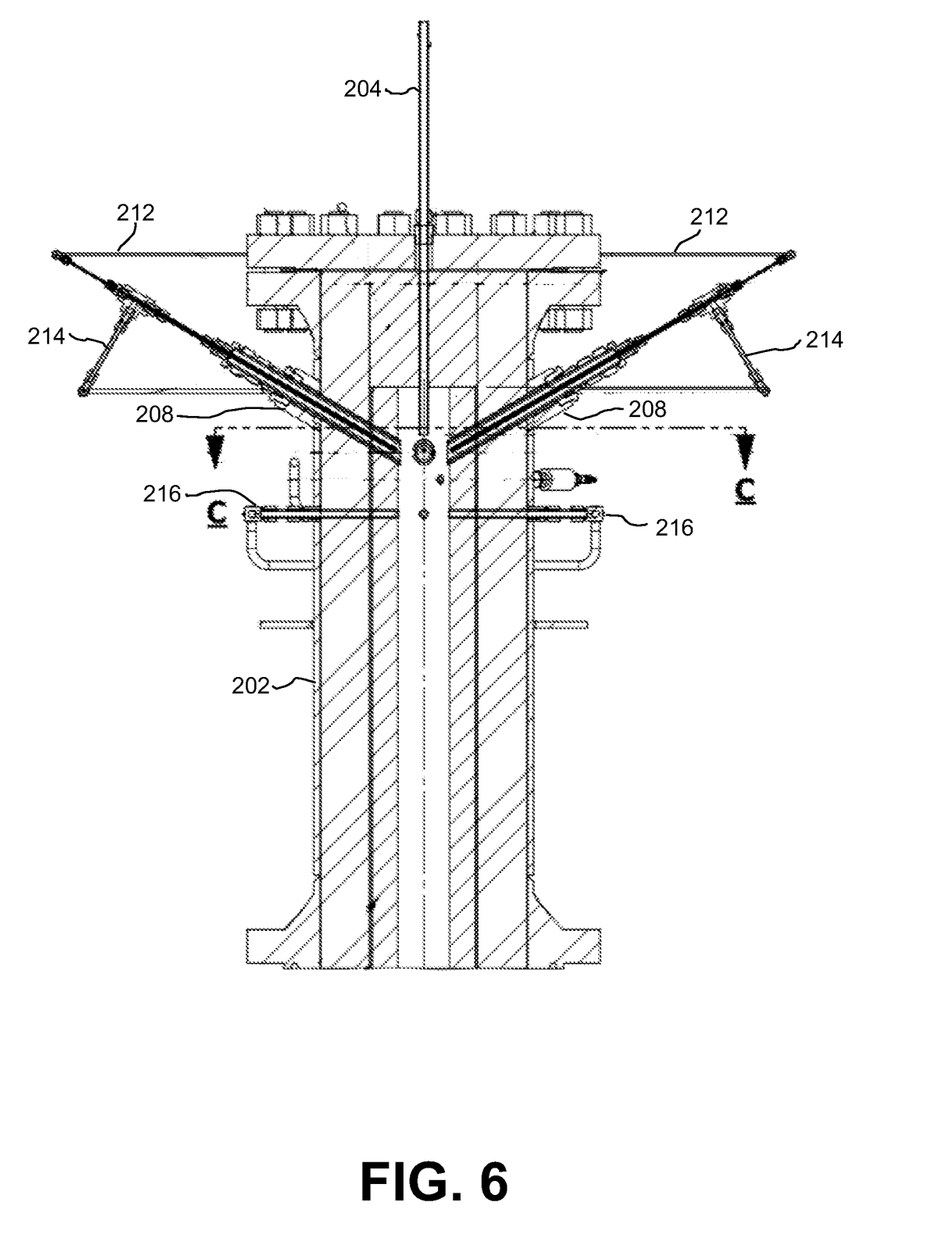
FIG. 6 is a side, cross-sectional view of the portion of the example material processing system from FIG. 3.

FIG. 4 is a top view of the portion of system 200 from FIG. 3. FIG. 5 is a side view of the portion of system 200 from FIG. 3. FIG. 6 is a side, cross-sectional view of the portion of system 200 from FIG. 3.

Figure 7:
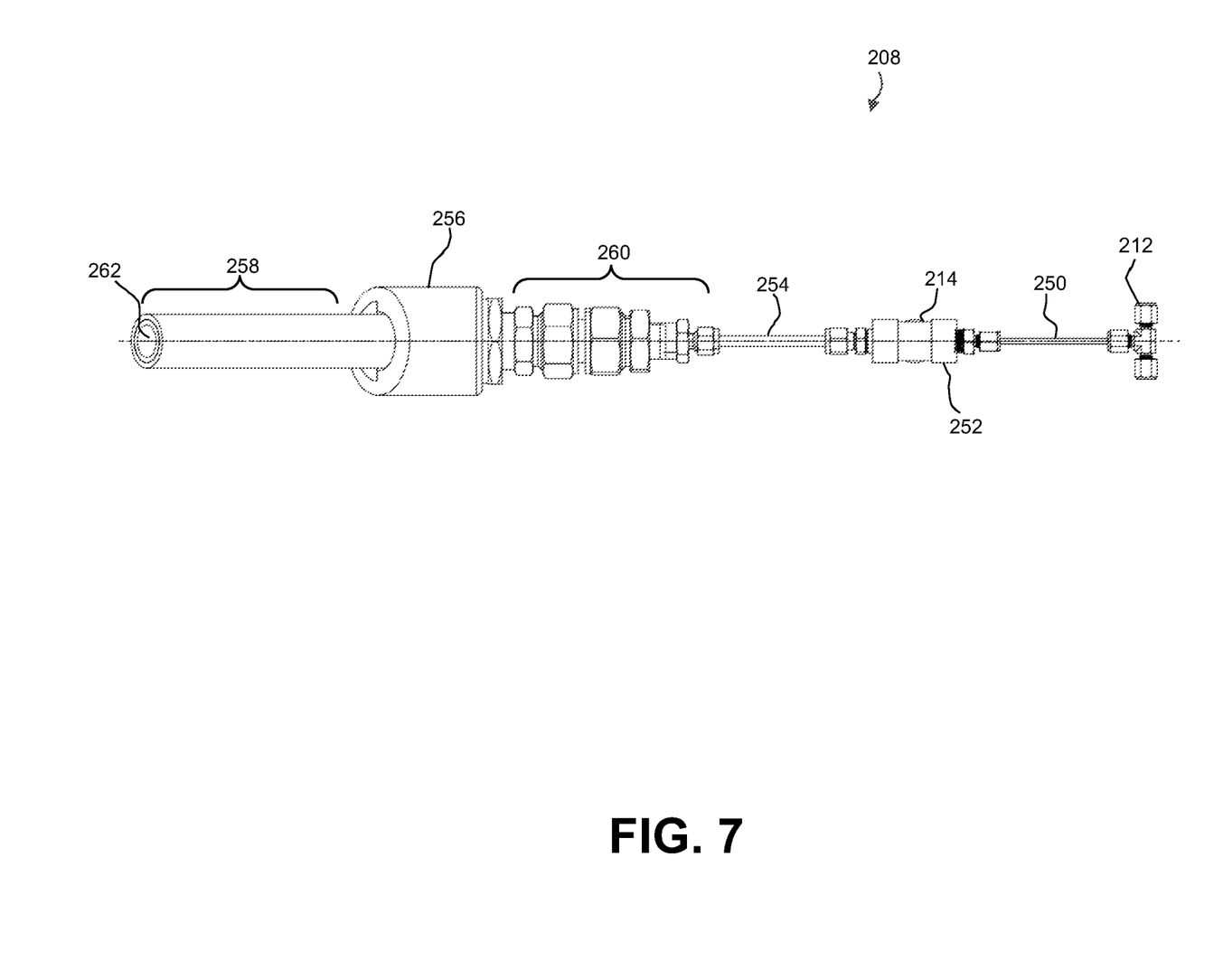
FIG. 7 is a side view of a torch from the example material processing system from FIG. 2.
Figure 8:
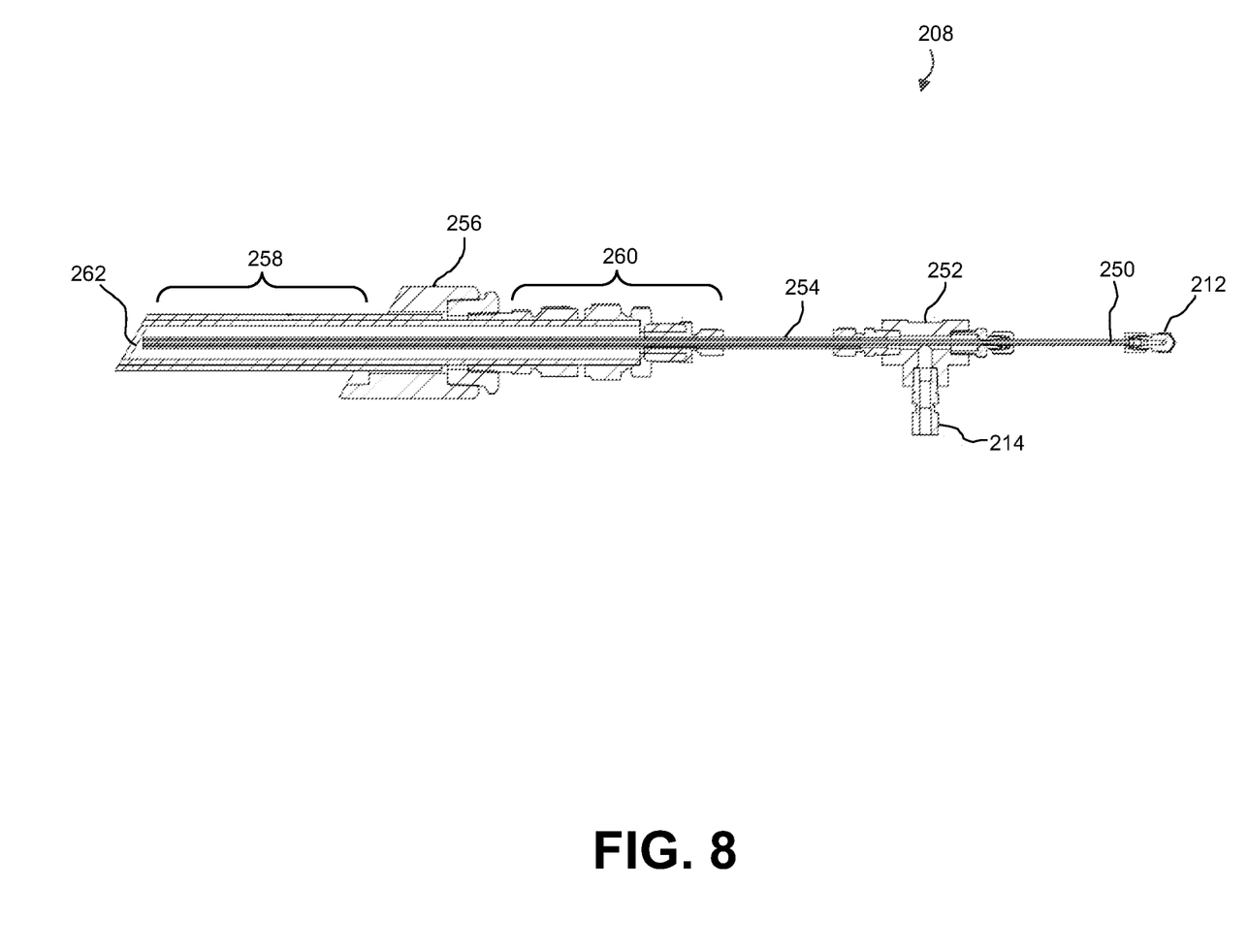
FIG. 8 is a side, cross-sectional view of the torch from FIG. 7.
Figure 9:
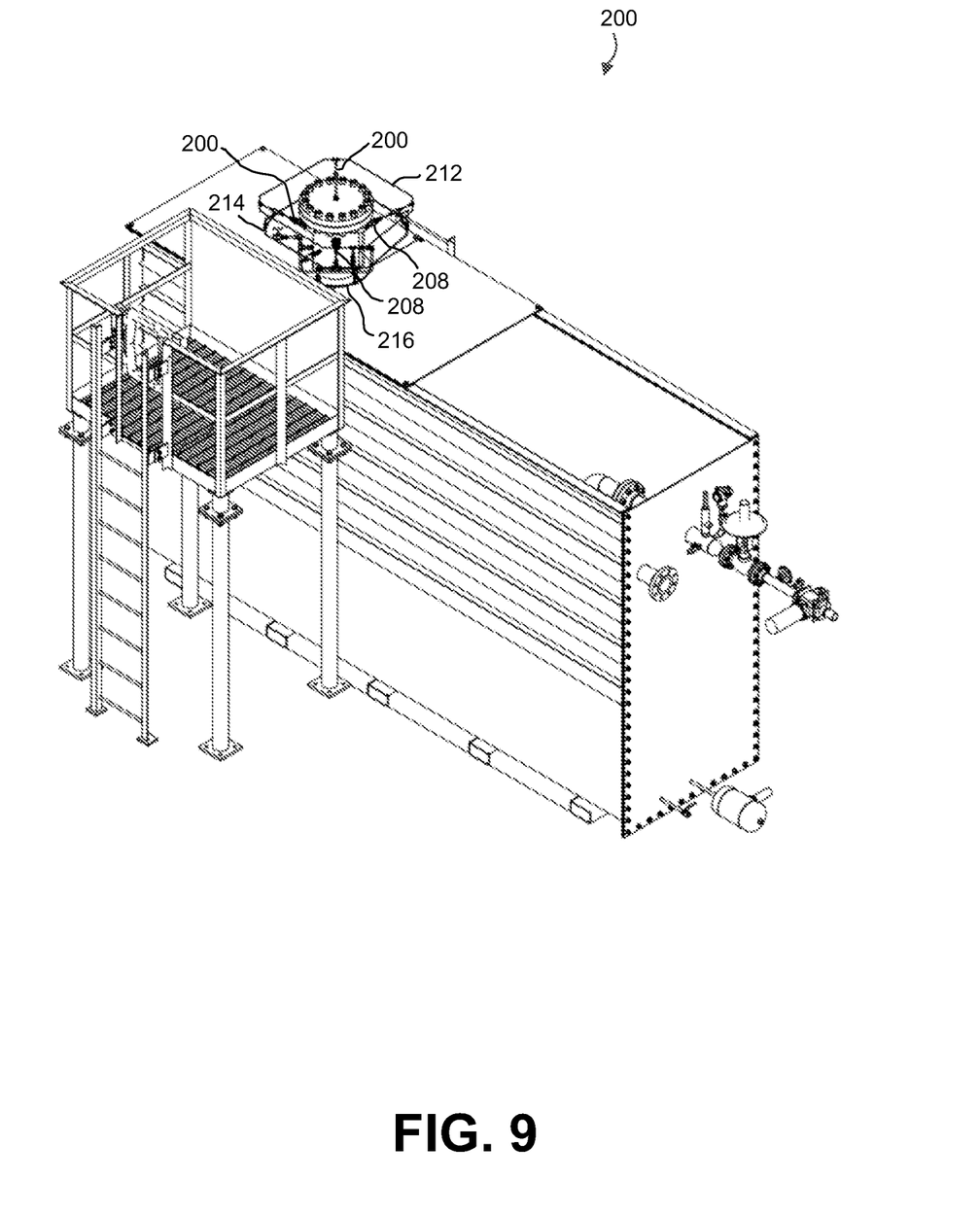
FIG. 9 is a perspective view of an implementation of the example material processing system from FIG. 2.
Figure 10:
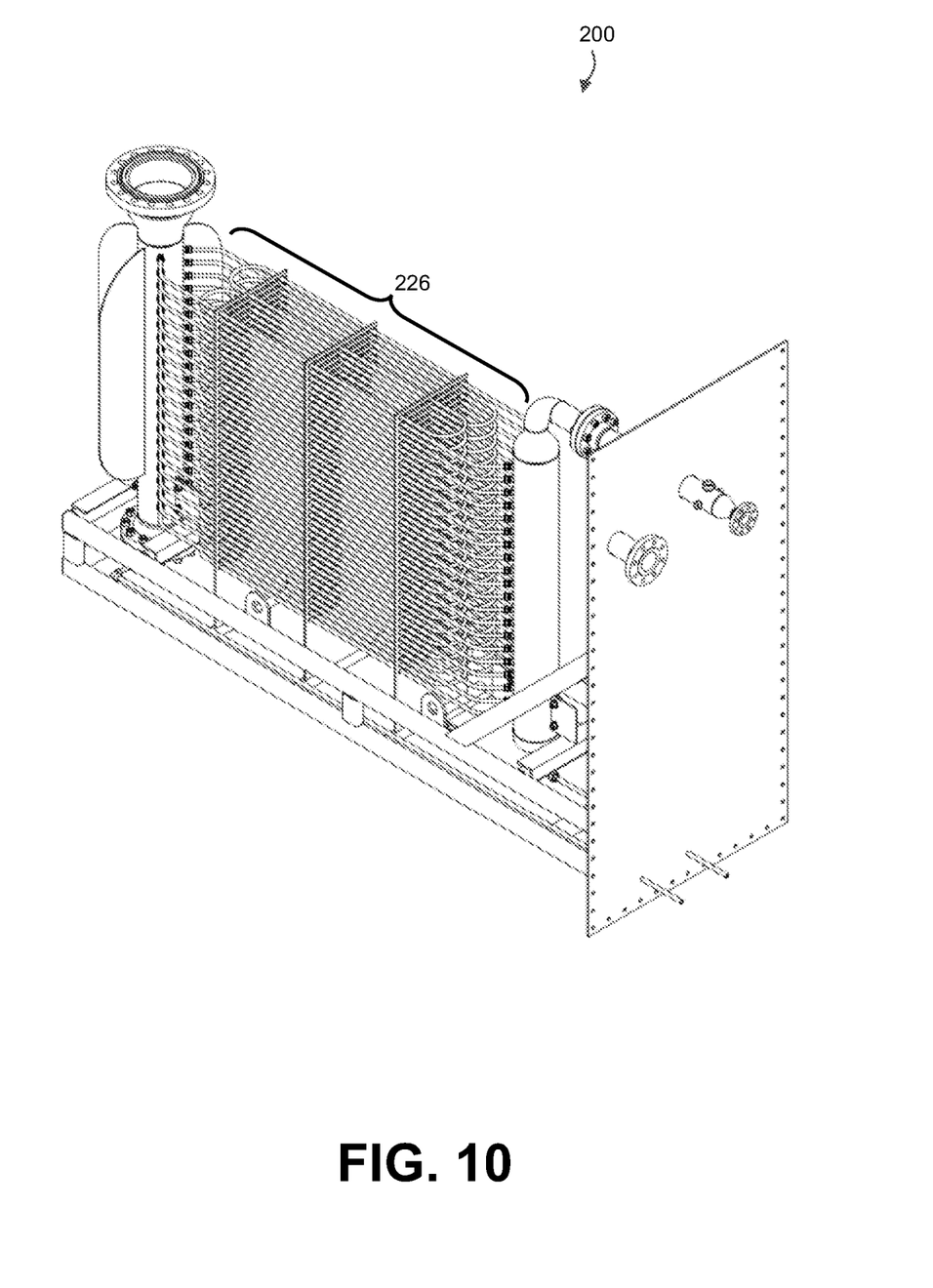
FIG. 10 is a perspective, cut-away view of the implementation of the example material processing system from FIG. 2.

FIGS. 7 and 8 are side and side cross-sectional views, respectively, of a torch 208 such as depicted in the system 200 of FIGS. 2-6. As shown in FIGS. 7 and 8, torch 208 includes inputs 212 and 214. As noted above, in some examples input 212 may be for receiving a supply of a torch fuel, such as hydrogen ($H_2$) or methane ($CH_4$), and a second input 214 may be for receiving a supply of a second input, such as oxygen ($O_2$).

As shown in FIGS. 7 and 8, fuel at input 212 passes through an inner tube 250 to a tee fitting 252 which receives input 214 introduced into a outer tube 254 that is coaxial with inner tube 250. Tubes 250 and 254 extend through a coupling 256 which, as is apparent in FIG. 5, for example, abuts the side wall of reactor 202. A distal portion 258 of torch 208 extends into reactor 202.

In accordance with one example, an arrangement of fittings and bushings designated collectively with reference numeral 260 is provided for adjusting the extent to which the distal tips 262 of tubes 250 and 254 extend into reactor 202. In one example, the spatial positioning of torch tip 262 may be adjusted to optimize the reactions taking place within combustion zone 211, and adjustment of the position of torch tip 262 may be desirable depending upon the nature and composition of input feedstock 206. It is known that a flame, such as a torch flame, has multiple different zones, such as an inner "non-luminous zone," a "dark zone" a "luminous zone," and a "non-luminous veil;" these different zones are characterized by different relative temperatures, and the presence and extent of one or more of these zones may be dependent upon the fuel being combusted as well as the combustion environment (e.g., the oxygen concentration). In one example, the extension of torch tips 262 may be adjusted to ensure that an incoming input feedstock stream 206 passes through optimal zones of each torch flame 210. To the extent that in some examples, input feedstock stream 206 may pass through or past a succession of torch flames 210, and each torch tip 262 may be adjusted independently to achieve optimal results.

At least one example has been described herein for the purposes of illustration. It is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made without departing from the technical and legal scope of the appended claims.

What is claimed is:

1. An apparatus for processing input material, comprising:
   a hydrogen torch reactor vessel defining a combustion zone;
   the hydrogen torch reactor vessel having at least one input for a combustible torch fuel to at least one torch nozzle, the at least one torch nozzle being adapted to generate at least one non-plasma flame within said reactor;
   the hydrogen torch reactor vessel further having at least one input port for receiving the input feedstock, the input feedstock being directed proximally to the at least one flame;
   the hydrogen torch reactor vessel further having an output for discharging a primary reactor output stream;
   at least one cooler coupled to receive the primary reactor output stream and operable to cool the primary reactor output stream and generate a secondary output stream;
   a separator, coupled to receive the secondary output stream from the at least one cooler, the separator being operable to further extract at least one gas from the secondary output stream; and
   a boiler and a superheater, the boiler and the superheater connected to the hydrogen torch reactor vessel via a steam input line, the steam input line connected to a steam input port to the hydrogen torch reactor vessel.

2. An apparatus in accordance with claim 1, wherein the hydrogen torch reactor vessel further having at least one input port for receiving the input feedstock, the input feedstock being selectively directed proximally to the tip of at least one flame and intersecting that flame at angle of 90 degrees plus or minus 60 degrees.

3. An apparatus in accordance with claim 1, wherein the at least one cooler further is further operable to precipitate solid impurities from the primary reactor output stream.

4. An apparatus in accordance with claim 1, wherein the combustible torch fuel comprises less than ten percent (10%) nitrogen.

5. An apparatus in accordance with claim 1, further comprising a preheater for preheating the input feedstock prior to introduction into the hydrogen torch reactor vessel.

6. An apparatus in accordance with claim 1, wherein the steam input line from the boiler and the superheater to the hydrogen torch reactor vessel is positioned downstream of the at least one torch nozzle.

\* \* \* \* \*